US008234069B2

(12) United States Patent
Ding et al.

(10) Patent No.: US 8,234,069 B2
(45) Date of Patent: *Jul. 31, 2012

(54) INDUSTRIAL VEHICLE FLEET MANAGEMENT SYSTEM

(75) Inventors: Steven A. Ding, Woodbridge, VA (US); Damon M. Manz, Alexandria, VA (US); Donald L. Mallonee, Jr., Huntingtown, MD (US)

(73) Assignee: United States Postal Service, Washington, DC (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/379,049

(22) Filed: Feb. 11, 2009

(65) Prior Publication Data

US 2009/0177377 A1 Jul. 9, 2009

Related U.S. Application Data

(62) Division of application No. 10/844,420, filed on May 13, 2004.

(60) Provisional application No. 60/470,037, filed on May 13, 2003.

(51) Int. Cl.
*G06N 5/00* (2006.01)
*G06F 19/00* (2011.01)
*G06Q 10/00* (2012.01)
*G06N 5/02* (2006.01)

(52) U.S. Cl. ............. 701/533; 701/22; 701/50; 701/532

(58) Field of Classification Search .................. 340/568; 701/202, 22, 50, 532–533; 705/9–10; 706/52
See application file for complete search history.

(56) References Cited

U.S. PATENT DOCUMENTS

| 4,757,712 | A | | 7/1988 | Jurca |
| 4,857,925 | A | * | 8/1989 | Brubaker ...................... 340/994 |
| 4,949,263 | A | | 8/1990 | Jurca |
| 5,006,996 | A | * | 4/1991 | Nakamura et al. ............ 700/215 |
| 5,337,236 | A | | 8/1994 | Fogg et al. |
| 5,678,194 | A | * | 10/1997 | Grube et al. .................. 701/207 |
| 5,754,965 | A | * | 5/1998 | Hagenbuch .................... 701/35 |
| 5,774,876 | A | | 6/1998 | Woolley et al. |
| 5,880,958 | A | * | 3/1999 | Helms et al. .................. 701/117 |
| 6,148,291 | A | | 11/2000 | Radican |
| 6,212,393 | B1 | * | 4/2001 | Suarez et al. .............. 455/456.4 |

(Continued)

FOREIGN PATENT DOCUMENTS

AT   89941 A   11/1922

(Continued)

OTHER PUBLICATIONS

Jack Hammersfahr, R. D., and Edward R. Clayton. 1983. "A Computer Simulation Model to Assist Intermodal Terminal Managers in Operations Analysis." Transportation Journal 22, No. 4: 55-68. Business Source Complete, EBSCOhost (accessed Dec. 15, 2009).*

(Continued)

*Primary Examiner* — Khoi Tran
*Assistant Examiner* — Dale Moyer
(74) *Attorney, Agent, or Firm* — Lewis and Roca LLP

(57) ABSTRACT

Embodiments consistent with the invention are an apparatus for and method of generating data on current utilization of powered industrial vehicles, generating preferred routing assignments for powered industrial drivers, and presenting preferred routing assignments for powered industrial vehicle drivers.

8 Claims, 3 Drawing Sheets

U.S. PATENT DOCUMENTS

| | | | |
|---|---|---|---|
| 6,226,622 B1 * | 5/2001 | Dabbiere | ......................... 705/28 |
| 6,285,951 B1 | 9/2001 | Gaskins et al. | |
| 6,560,532 B2 | 5/2003 | Cayford | |
| 6,581,001 B1 | 6/2003 | Katsuka et al. | |
| 6,600,418 B2 | 7/2003 | Francis et al. | |
| 6,799,099 B2 | 9/2004 | Zeitler et al. | |
| 6,983,883 B2 | 1/2006 | Ridling | |
| 2002/0059075 A1 | 5/2002 | Schick et al. | |
| 2003/0055666 A1 | 3/2003 | Roddy et al. | |
| 2005/0125247 A1 | 6/2005 | Ding et al. | |
| 2006/0178812 A1 * | 8/2006 | Affleck et al. | ................ 701/201 |
| 2009/0157305 A1 | 6/2009 | Ding et al. | |

FOREIGN PATENT DOCUMENTS

| | | |
|---|---|---|
| WO | 01/15001 A2 | 3/2001 |
| WO | 01/15001 A3 | 3/2001 |
| WO | 01/84506 A2 | 11/2001 |
| WO | 01/84506 A3 | 11/2001 |

OTHER PUBLICATIONS

McAree, P., Bodin, L., & Ball, M. (2002). Models for the design and analysis of a large package sort facility. [Electronic version]. Networks, 39, 107-120.*

Hall, R.W., (2001).Truck scheduling for ground to air connectivity. [Electronic version]. Journal of Air Transport Management, 7, 331-338.*

Final Office Action mailed Nov. 8, 2010 in copending U.S. Appl. No. 10/844,420, filed May 13, 2004 entitled "Industrial Vehicle Fleet Management System," 18 pages.

International Search Report for PCT/US2004/014957, dated Feb. 4, 2005, 6 pages.

Written Opinion of the International Searching Authority for PCT/US2004/014957, dated Feb. 4, 2005, 9 pages.

Office Action mailed Oct. 13, 2009 in copending U.S. Appl. No. 12/379,048, filed Feb. 11, 2009 entitled "Industrial Vehicle Fleet Management System," 16 pages.

Final Office Action mailed Apr. 9, 2010 in copending U.S. Appl. No. 12/379,048, filed Feb. 11, 2009 entitled "Industrial Vehicle Fleet Management System," 11 pages.

Office Action mailed Mar. 10, 2009 in copending U.S. Appl. No. 10/844,420, filed May 13, 2004 entitled "Industrial Vehicle Fleet Management System," 18 pages.

Office Action mailed Apr. 23, 2010 in copending U.S. Appl. No. 10/844,420, filed May 13, 2004 entitled "Industrial Vehicle Fleet Management System," 20 pages.

Final Office Action mailed Jan. 4, 2010 in copending U.S. Appl. No. 10/844,420, filed May 13, 2004 entitled "Industrial Vehicle Fleet Management System," 18 pages.

Office Action mailed Aug. 27, 2010 in copending U.S. Appl. No. 12/379,048, filed Feb. 11, 2009, entitled Industrial Vehicle Fleet Management System, 15 pages.

* cited by examiner

|    | start location | start time | pick up container / identifier | load | end location | end time | drop off container | distance |
|----|---|---|---|---|---|---|---|---|
| 10 | station 4 processed staging area | 6:58 | 323 | yes | station 5 input staging area | 7:01 | 323 | 80 feet |
| 11 | station 5 input staging area | 7:01 | | | station 3 input staging area | 7:08 | | 200 feet |
| 12 | station 3 input staging area | 7:08 | 142, 89, 90 | no, no, no | station 5 processed staging area | 7:15 | 90 | 200 feet |
| 13 | station 5 processed staging area | 7:15 | | | station 1 processed staging area | 7:23 | 89, 142 | 80 feet |

Fig. 1

PIV _____
Driver _____

| start location | start time | pick up container / identifier | end location | end time | drop off container | route |
|---|---|---|---|---|---|---|
| dock | 6:20 AM | 204 | station 1 – input staging area | 6:25 | 204 | A |
| station 1 – input staging area | 6:30 | 408 | station 1 processed staging area | 6:32 | 408 | |
| dock | 6:37 | 205, 206, 112 | station 1 input staging area | 6:46 | 205, 206, 112 | A |
| station 1 input staging area | 6:46 | | station 4 processed staging area | 6:57 | | B |
| station 4 processed staging area | 6:58 | 323 | station 5 input staging area | 7:00 | 323 | C |
| station 5 input staging area | 7:01 | | station 3 input staging area | 7:08 | | D |
| station 3 input staging area | 7:08 | 142, 89, 90 | station 5 processed staging area | 7:15 | 90 | E |
| station 5 processed staging area | 7:15 | | station 1 processed staging area | 7:23 | 89, 142 | F |

Fig. 3

INDUSTRIAL VEHICLE FLEET MANAGEMENT SYSTEM

CROSS REFERENCE TO RELATED APPLICATION

This is a division of application Ser. No. 10/844,420, filed May 13, 2004, which claims priority under 35 U.S.C. §119 based on U.S. Provisional Application No. 60/470,037, filed on May 13, 2003, both of which are expressly incorporated herein by reference.

BACKGROUND

Technical Field

Embodiments disclosed herein relate to a method of generating data for calculating current utilization of powered industrial vehicles and a method of generating assignments, which if followed may approximate optimal utilization of the powered industrial vehicles.

A powered industrial vehicle ("PIV") is a vehicle used in transporting heavy loads. Examples of powered industrial vehicles are forklifts and jitneys, sometimes referred to as tuggers. Forklifts have an "L-shaped" structure with two projections extending in front of the PIV, which may be raised and lowered from the floor (level with the bottom surface of the wheels of the PIV to many feet above the floor (twelve to fifteen), depending on the design. Forklifts are most often used to transport things strapped or otherwise attached to pallets. Other vehicles, such as a "tugger," may have at least one, and up to six, trailers or wheeled rolling containers attached to the back of the vehicle.

As used in the United States Postal Service mail processing facilities, PIVs transport pallets or rolling containers which either do, or will contain mail. The U.S. Postal Service mail processing facilities are laid out with work areas and aisleways. The work areas contain mail processing stations which are operated by personnel. The aisleways are often shared by both PIVs and personnel, however, in some instances, dedicated PIV aisles may be utilized.

When mail trucks arrive at predetermined times each day at the docks with the mail picked up from other sites, PIVs are used to remove the mail transport equipment (MTE) from the trucks and to transport it (either a pallet or a container) to the appropriate mail processing station. Then, to process the mail, it is removed, as stored in mail trays, from the pallet or container and after processing, the mail trays containing mail are placed in another container or on another pallet. Each processing station typically has an input and output staging area of a predetermined size where incoming or processed mail may accumulate. When, or before, the processed mail staging area is full, PIVs are used to transport the pallets or containers of processed mail from one processing station to the next. At predetermined times, when the processed mail needs to be available for loading onto an outbound truck, PIVs are used to transport the pallets or containers with processed mail, even if not full, from the last processing station to the staging area near the dock for the truck.

The current utilization of the PIVs and PIV drivers depends on decisions made by the PIV drivers and the number of properly working PIVs. The PIV drivers learn the proper route of mail from the inbound trucks through the mail processing stations to the outbound trucks, for each approved mail process. The PIV drivers are also aware of the regular schedule of inbound and outbound mail trucks at the docks. PIV drivers make the routing decision for each pallet or container of mail unless a supervisor communicates with them while driving via a paging system to give instructions to remove or deliver a pallet or container at a particular mail processing station. The routing decision includes the start time, drop-off location, and path of the route to transport a pallet or container from any location in the facilities to where it is or will be needed.

While the driver is enroute, the supervisor may visually locate the particular PIV the driver is using within 100 feet. As U.S. Postal Service facilities are large, but the mail processing stations and aisles are less than 100 feet apart, the current system, Asset Management and Tracking System as provided by I.D. Systems, Inc., of Hackensack, N.J. does not provide insight as to the exact location of the PIV and driver within a 100 foot radius circle. Thus the existing graphical display capabilities from radio frequency transmitters on each PIV and receivers spread through out the facility, just show each PIV appearing at a location that is accurate within 100 feet of its actual location. The transmitted location data is updated approximately every 30 seconds, and thus graphically, each PIV appears to "hop" throughout the building, but no particular path is depicted.

Moreover, there is no planned assignment or expected time that any particular trip should take. Experienced PIV drivers develop an estimate of how long it will take them to drive a PIV from one location to another, and use that in making the routing decisions. But a supervisor has no way of knowing whether the time that it takes a PIV driver to transport a pallet or container from point A to point B is more or less time than it takes to safely transport a pallet or container from point A to point B. Currently optimal routes between mail processing stations have not been prescribed, nor is there knowledge whether or not the current utilization of PIVs and PIV drivers is the optimal one. Thus the work flow may not be as efficient as it could be and a supervisor does not have a very accurate indication of how many PIV vehicles and associated drivers he or she should use in a day to have optimal utilization of these assets and optimal labor efficiency.

There is a need for data on current PIV utilization and labor efficiency. There is a need to obtain this information as inexpensively as possible. There is a need to predict how many PIVs and associated drivers are needed for any given amount of mail and number of pallets and containers in need of transporting. There is a need for generating assignments, with expected time schedules and pathways, to efficiently use the labor force, PIVs, and mail processing stations.

SUMMARY

As embodied and broadly described herein, an embodiment consistent with the invention is a method of generating data on current utilization of powered industrial vehicles which includes recording the driver, time, and location, of the start of any motion of a powered industrial vehicle as well as the time and location of a subsequent stop of the powered industrial vehicle, the path driven by or the instantaneous speed of or total distance traveled by the powered industrial vehicle between the recorded start and stop locations, an identifier of any pallet or container that is being picked up at a start location and whether the pallet or container is carrying a load, and the identifier of any pallet or container that is being dropped off at a stop location. The preferred minimum distance may be measured between all expected pick-up or drop-off locations. The above recorded data and measurements may be stored in a database for tabular or graphical presentation for use in calculating desired utilization indicators by powered industrial vehicle and driver.

As embodied and broadly described herein, another embodiment consistent with the invention is an apparatus for optimizing usage of a powered industrial vehicle. The apparatus may include a transmitter on the vehicle transmitting data therefrom and at least one load sensor operatively coupled to the transmitter. The load sensor is on the vehicle and generates data from which the presence of a pallet or container being transported by the vehicle can be determined. The apparatus may also include a receiver disposed to receive transmissions of data from the transmitter from which the location of the vehicle and the presence of a pallet or container being transported can be determined, a computer programmed to determine the optimal path of the vehicle and generate data commands, a transmitter operatively coupled to the computer to transmit the data commands to the vehicle, and a display disposed to display the commands in a form readable by a human operator of the vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention. In the drawings, FIG. 1 is a chart with example values recorded;

FIG. 3 is an example assignment for a PIV driver with expected route and times, indicating whether a pallet should be picked up or dropped-off.

DESCRIPTION OF EMBODIMENTS

Figure 2:
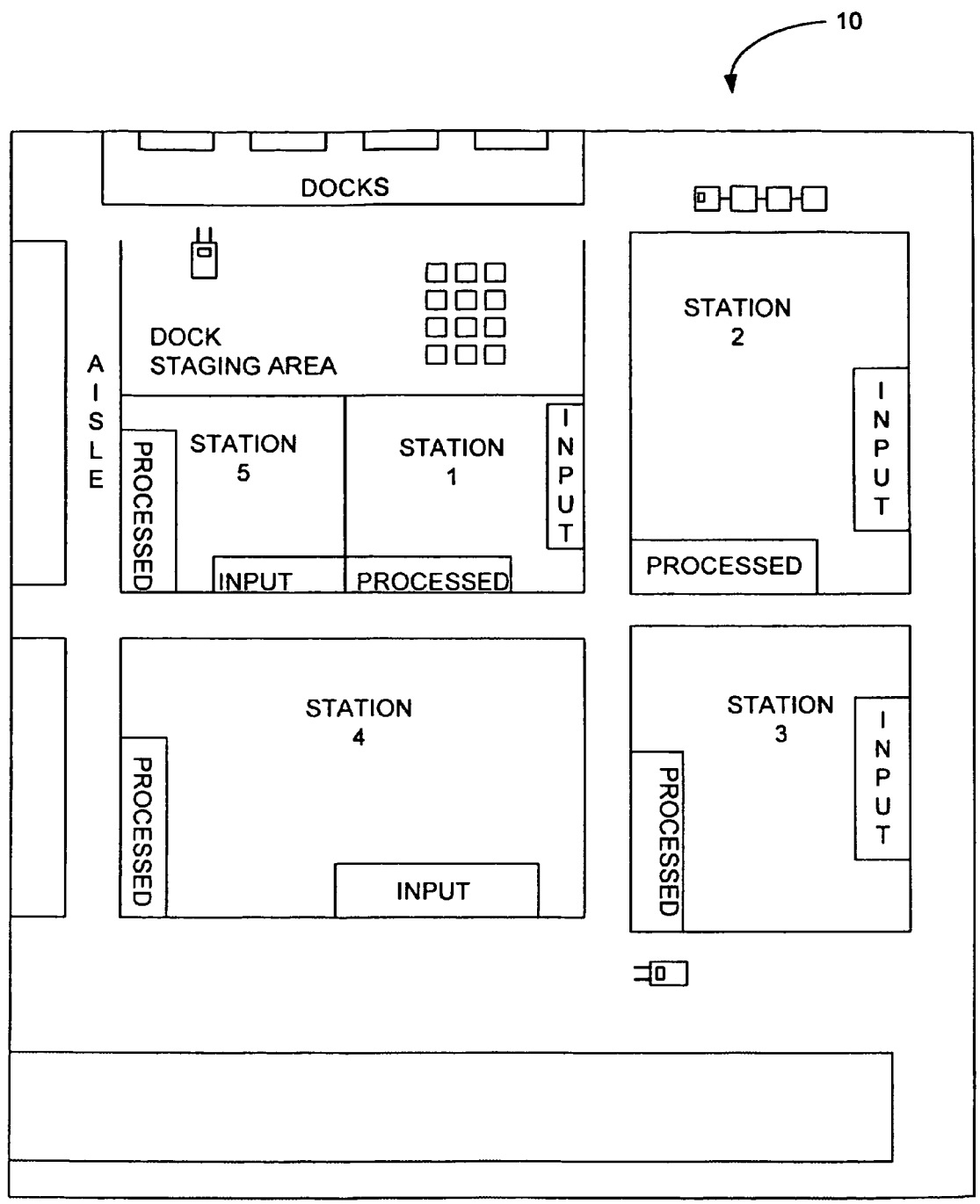
FIG. 2 is a floor plan of an example U.S. Postal Service mail processing facility.

Reference will now be made in detail to the exemplary embodiments consistent with the invention, examples of which are illustrated in the accompanying drawings. Wherever possible, the same reference numbers will be used throughout the drawings to refer to the same or like parts.

A method for generating data on current utilization of powered industrial vehicles, consistent with the invention, may comprise recording for each PIV, the driver of that PIV, and the time and location within the facility when the PIV begins to move. If a pallet is being lifted or a container being pulled by the PIV, that may be recorded as well as whether the pallet or container is carrying a load of mail. The path driven may be recorded, as well as the instantaneous speed or the total distance driven between a start location and a stop location. The time that and location where the PIV stops may be noted, as well as whether any pallet or container is removed from (dropped-off by) the PIV and if any pallet or container is connected to or picked-up by the PIV. When a pallet or container is added or removed, the identifier of that pallet or container may be recorded as well as whether it is carrying mail.

FIG. 1 illustrates a chart that could be used to gather the needed data, except the path of the PIV. This chart could be filled out by either the driver, if sufficient confidence in the data exists, or by another person either riding with or following the driver and PIV, if the loss of time to have the driver record his or her information is unacceptable, or if there is not sufficient confidence in the data recorded by the driver. Values that might be generated from a hypothetical route and floor plan are present in the chart in FIG. 1 to illustrate how such a chart might look in use.

Due to the way fork lifts operate, there may be many starts and stops as the driver positions the fork lift to align the forks in the opening of the pallet. There may also be multiple starts and stops at each staging area, if the location to be occupied by the pallet to be dropped off is currently occupied by another pallet that first needs to be removed. A fork lift driver must first drop-off the current pallet and then maneuver to pick and remove the blocking pallet, finding a location at which to drop it off, before returning to pick up the desired pallet and drop it off at the proper location in the staging area. This is illustrated in rows 1 through 6 of the chart in FIG. 1. Here the fork lift driver has picked up loaded pallet 204 from the dock and dropped it off at station 1 input staging area. However, a previous pallet number 408, now empty, needs to be moved, before loaded pallet 204 may be appropriately placed at station 1. Thus the driver must move from pallet 204 to pallet 408, then pick up pallet 408 and move it out of the way and drop it off. Then return to pallet 204 and pick it up and place it in the staging area. The fork lift driver then picks up and transports pallet 408 to the processed mail staging area of station 1, where station 1 personnel will fill it with processed mail.

Continuing at line 7 FIG. 1, the PIV driver returns to the dock and picks up three containers (for use in this example, the PIV is no longer a fork lift, but a tugger), numbers 205, 206 and 112. The PIV driver then transports these to station 1's input staging area, where the first loaded pallet 204 was brought. All three of the containers are dropped off at station 1 (see line 8 of FIG. 1). As recorded in lines 9 and 10, the PIV driver travels to station 4 processed mail staging area, where he picks up a loaded container 323 and transports it to station 5's input staging area and drops it off. From there, the PIV driver goes to station 3's input staging area and picks up three empty containers, which used to contain mail, and drops off one of them at station 5's processed mail staging area, where it is needed to receive processed mail. The other two empty containers are transported to station 1 processed mail staging area, where they will be positioned to receive processed mail at a later time. As may be evident, keeping track manually is time consuming and generates many pages if recorded on paper. If handwritten, this data would need to be entered into a database for use in utilization calculations.

To record the path, a copy of the floor plan would need to be available for each complete motion. This too would generate many pages if recorded on paper. FIG. 2 illustrates an example floor plan which could be provided in conjunction with the chart illustrated in FIG. 1, on which to record the path corresponding to each line of FIG. 1.

A method of collecting the data faster than recording it by hand by either the driver or another person, is to make a hand-held device or a touch screen on the PIV, which has drop down menus from which the driver or other person may select the appropriate information. This data may be stored electronically and then transferred or downloaded to the computer containing the database and formulas for the desired calculations.

Alternatively, and preferably, the data may be automatically generated and stored by the use of improvements over existing PIV tracking products, such as Asset Management and Tracking System, sold by I.D. Systems of Hackensack, N.J. Improvements would include the use of sensors and appropriate electronics on each PIV that can produce signals that allow the detection of 1) the presence and quantity of a transported load (the number of pallets or containers), 2) the identifiers of any pallets or containers which it transports, and 3) the location of the PIV to an accuracy of 10 feet or preferably the path driven by the PIV. These load and pallet or container identifier sensors and electronics would be operatively coupled to a data transmitter installed on each PIV. This data would be transmitted from the PIV via the data transmitter and received by receivers installed through out the facility to be stored in the main computer/server available to the supervisor and industrial engineers. Once available on this computer/server, the values stored could be used by existing graphical display programs to indicate to the supervisor the historical record of any motion of a PIV and its associated driver.

Separate from and in addition to the above activity, the preferred routes between any two expected pick-up and drop-off locations within the facilities may be established and measured. Statistical descriptions of the time to safely drive a PIV along any and all of the preferred routes may also be established and stored in electronic memory. Statistical descriptions of the time that each mail station takes to process a fully loaded pallet or container of mail may be established and stored in electronic memory. Statistics on times when the processing stations are staffed or not staffed with mail personnel [mail clerks] for processing the mail may be established and stored in electronic memory The recorded, measured, and statistical data may be used in calculations of utilization by vehicle and driver. Calculations that may be of use in determining utilization of the PIVs and of the PIV drivers on a per shift basis follow in Table 1:

TABLE 1

| | Desired information |
|---|---|
| 1 | time in motion |
| 2 | time transporting a pallet or container between expected pick-up and drop-off locations |
| 3 | time transporting a loaded pallet or container between expected pick-up and drop-off locations |
| 4 | number of pallets or containers picked-up and dropped-off between expected pick-up and drop-off locations |
| 5 | number of loaded pallets or containers picked-up and dropped-off between expected pick-up and drop-off locations |
| 6 | distance driven between expected pick-up and drop-off locations, in excess of preferred minimum distance, by discrete trip |
| 7 | percent of time in motion spent transporting a pallet or container between expected pick-up and drop-off locations. |

Of course, until the maximum expected time transporting a pallet or container between expected pick-up and drop-off locations is calculated, these numbers only provide comparisons among drivers, and not a true measure of utilization, unless 100 percent of the time should be spent carrying a pallet or container between expected pick-up and drop-off locations, which is unlikely.

The statistical data gathered, as described above, can be used to simulate the progress and accumulation of full and empty pallets and containers. The simulation may also provide the maximum expected time transporting a pallet or container needed to calculate true utilization numbers for the PIVs and PIV drivers. The simulation may be calculated by hand, but may be much more expeditiously accomplished by using a standard computer simulation program for modeling manufacturing processes. Examples of such programs are AutoMod sold by Brooks Automation/AutoMod Group and Arena, sold by Rockwell Software. Also, the Micro Analytics school bus routing model, logistics routing tools, such as Logistics Laboratory as developed by Northwestern University Production and U.S. Postal Service developed simulation models such as the Transportation Optimization Planning and Scheduling system (TOPS) and PostalCAD, as other examples, may be modified and used to develop specific PIV routes. The shift supervisor's computer may contain this program or the simulation program may be resident on a server with which the shift supervisor's computer is networked. Thus for a given amount of mail arriving in a predetermined number of pallets and containers, optimal times and routes may be established for a minimum number of PIVs to enable the processing of that mail to proceed without delay.

From the simulation, routing assignments may be generated for each of the minimum number of powered industrial vehicles, including expected pathways, time schedules, and expected numbers of pallets or containers to transport. A hypothetical routing assignment is illustrated in FIG. 3. The routes are designated by letters, but would be known to the PIV drivers, or available to them in paper or in interactive graphical displays. These routing assignments may be provided on paper printouts, but would more likely be more useful as part of graphical displays available on each PIV, with the ability for the PIV driver to indicate when he or she has completed any discrete part of the assignment. Thus the computer or server which generates the preferred routing assignments may be operatively coupled to a transmitter that may transmit the preferred routing assignments in the form of data commands to the proper PIV, and the PIV would be equipped with a data receiver and display to convert such data commands into a form that a PIV driver may easily read.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

| | | | PIV_____ | | | | | |
|---|---|---|---|---|---|---|---|---|
| | | | Driver_____ | | | | | |
| | start location | start time | pick up container/ identifier | load | end location | end time | drop off container | distance |
| 1 | dock | 6:20 AM | 204 | yes | station 1 - input staging area | 6:25 | 204 | 150 feet |
| 2 | station 1 - input staging area | 6:25 | | | station 1 - input staging area | 6:26 | | 10 feet |
| 3 | station 1 - input staging area | 6:26 | 408 | no | station 1 - input staging area | 6:27 | 408 | 10 feet |
| 4 | station 1 - input staging area | 6:27 | | | station 1 - input staging area | 6:28 | | 10 feet |

-continued

PIV_____
Driver

| | start location | start time | pick up container/ identifier | load | end location | end time | drop off container | distance |
|---|---|---|---|---|---|---|---|---|
| 5 | station 1 - input staging area | 6:28 | 204 | yes | station 1 - input staging area | 6:29 | 204 | 10 feet |
| 6 | station 1 - input staging area | 6:30 | 408 | no | station 1 processed staging area | 6:32 | 408 | 75 feet |
| 7 | station 1 processed staging area | 6:32 | | | dock | 6:36 | | 170 feet |
| 8 | dock | 6:37 | 205, 206, 112 | yes, yes, yes | station 1 input staging area | 6:46 | 205, 206, 112 | 150 feet |
| 9 | station 1 input staging area | 6:46 | | | station 4 processed staging area | 6:57 | | 270 feet |

What is claimed is:

1. A computer-implemented method of generating preferred routing assignments for powered industrial vehicle drivers, comprising:
using a computer, determining an average time to safely drive a powered industrial vehicle on preferred minimum distances between a plurality of mail processing stations;
wherein there are alternate pathways between and among the plurality of mail processing stations;
using the computer, developing statistics on the time mail processing stations required to process an incoming pallet or container as well as generate an outgoing pallet or container;
using the computer, estimating the amount of incoming mail based on the number of pallets and containers on incoming trucks;
using the computer, using the average time, developed statistics, and estimated incoming mail to simulate the work flow of the incoming mail;
using the computer, determining the number and timing of loaded pallets and containers to be removed from and delivered to the plurality of mail processing stations and the number and timing of empty pallets and containers to be removed from and delivered to the plurality of mail processing stations;
using the computer, calculating a minimum number of powered industrial vehicles that is needed to timely distribute and process the mail between and among the plurality of mail processing stations;
using the computer, generating assignments for the minimum number of powered industrial vehicles, including expected pathways between and among the plurality of mail processing stations and time schedules;
using the computer, receiving, from a sensor in communication with a powered industrial vehicle, a path driven by the powered industrial vehicle; and
using the computer, developing time statistics on time mail processing stations required to process two or more incoming pallets or containers at a same time.

2. The computer-implemented of claim 1, further comprising, using a computer, transmitting the generated assignments to powered industrial vehicles for graphical display to the drivers;
using the computer, transmitting an assignment to the minimum number of powered industrial vehicles for graphical display to the drivers.

3. A computer-implemented method of generating preferred routing assignments for powered industrial vehicle drivers, comprising:
using a computer, determining an average time to safely drive a powered industrial vehicle on preferred minimum distances between a plurality of mail processing stations;
wherein there are alternate pathways between and among the plurality of mail processing stations;
using the computer, developing statistics on the time mail processing stations required to process an incoming pallet or container as well as generate an outgoing pallet or container;
using the computer, estimating the amount of incoming mail based on the number of pallets and containers on incoming trucks;
using the computer, using the average time, developed statistics, and estimated incoming mail to simulate the work flow of the incoming mail;
using the computer, determining the number and timing of loaded pallets and containers to be removed from and delivered to the plurality of mail processing stations and the number and timing of empty pallets and containers to be removed from and delivered to the plurality of mail processing stations;
using the computer, calculating a minimum number of powered industrial vehicles that is needed to timely distribute and process the mail between and among the plurality of mail processing stations;
using the computer, generating assignments for the minimum number of powered industrial vehicles, including expected pathways between and among the plurality of mail processing stations and time schedules;
using the computer, transmitting an assignment to the minimum number of powered industrial vehicles for graphical display to the drivers;
using the computer, receiving, from a sensor in communication with a powered industrial vehicle, a path driven by the powered industrial vehicle; and
using the computer, developing time statistics on time mail processing stations required to process two or more incoming pallets or containers at a same time.

4. The computer-implemented method of claim 3, further comprising, using a computer, storing data indicating whether a pallet or container in a powered industrial vehicle contains a load of mail.

5. The computer-implemented method of claim 3, further comprising, using a computer, storing data indicating a time and location where a pallet or container is removed from a powered industrial vehicle.

6. The computer-implemented method of claim 3, further comprising, using a computer, storing data indicating a time and location where a pallet or container is loaded onto a powered industrial vehicle.

7. The computer-implemented method of claim 3, further comprising, using a computer, receiving, from a sensor in communication with a powered industrial vehicle, identifiers of any pallets or containers being transported by the powered industrial vehicle.

8. The computer-implemented method of claim 3, wherein developing statistics on time mail process stations required to process an incoming pallet or container comprises determining whether the mail processing stations are staffed.

* * * * *